(12) United States Patent
Wang et al.

(10) Patent No.: US 12,507,306 B2
(45) Date of Patent: Dec. 23, 2025

(54) METHOD, DEVICE AND COMPUTER STORAGE MEDIUM OF COMMUNICATION

(71) Applicant: NEC CORPORATION, Tokyo (JP)

(72) Inventors: Da Wang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 340 days.

(21) Appl. No.: 18/019,380

(22) PCT Filed: Sep. 15, 2020

(86) PCT No.: PCT/CN2020/115425
§ 371 (c)(1),
(2) Date: Feb. 2, 2023

(87) PCT Pub. No.: WO2022/056693
PCT Pub. Date: Mar. 24, 2022

(65) Prior Publication Data
US 2023/0284315 A1 Sep. 7, 2023

(51) Int. Cl.
*H04W 76/19* (2018.01)
*H04W 74/0833* (2024.01)
*H04W 74/0836* (2024.01)

(52) U.S. Cl.
CPC ....... *H04W 76/19* (2018.02); *H04W 74/0833* (2013.01); *H04W 74/0836* (2024.01)

(58) Field of Classification Search
CPC .............. H04W 76/19; H04W 74/0833; H04W 74/0836; H04W 76/27; Y02D 30/70
See application file for complete search history.

(56) References Cited

U.S. PATENT DOCUMENTS

| 11,516,873 B2 | 11/2022 | Kim et al. |
| 2022/0049749 A1* | 2/2022 | Bowden ............... F16D 69/026 |

(Continued)

FOREIGN PATENT DOCUMENTS

| CN | 107635258 A | 1/2018 |
| CN | 111034265 A | 4/2020 |

(Continued)

OTHER PUBLICATIONS

Extended European Search Report for EP Application No. EP20953554.1 dated on Jan. 24, 2024.

(Continued)

*Primary Examiner* — Shawn D Miller
(74) *Attorney, Agent, or Firm* — Sughrue Mion, PLLC

(57) ABSTRACT

Embodiments of the present disclosure relate to methods, devices and computer readable media for communication. A method comprises a terminal device determines whether one or more DRBs with uplink data to be transmitted support SDT. If the one or more DRBs support the SDT, the terminal device determines whether the uplink data is to be transmitted in the inactive state. If the uplink data is to be transmitted in the inactive state, the terminal device transmits the uplink data to a first network device in the inactive state. Upon receipt of the uplink data, the first network device transmits to a third network device a request for relocating an anchor for a context of the terminal device, the request comprising a first indication as to whether there is remaining data to be transmitted. In this way, an enhanced mechanism for SDT is achieved and lossless transmission for SDT is attained.

12 Claims, 6 Drawing Sheets

(56) References Cited

U.S. PATENT DOCUMENTS

| | | | |
|---|---|---|---|
| 2022/0104299 A1* | 3/2022 | Kim | H04W 48/20 |
| 2022/0248493 A1 | 8/2022 | Kim et al. | |
| 2023/0164628 A1* | 5/2023 | Zou | H04W 76/11 370/329 |

FOREIGN PATENT DOCUMENTS

| | | | | |
|---|---|---|---|---|
| EP | 3506708 A1 | | 7/2019 | |
| JP | 2023-508232 A | | 3/2023 | |
| WO | 2018/142207 A1 | | 8/2018 | |
| WO | 2018/214052 A1 | | 11/2018 | |
| WO | 2020/189958 A1 | | 9/2020 | |
| WO | WO-2021163394 A1 | * | 8/2021 | H04W 36/0033 |

OTHER PUBLICATIONS

Qualcomm Incorporated: "RACH based uplink small data transmission with or without anchor relocation", 3GPP Draft; R2-2007541, vol. RAN WG2, Aug. 7, 2020.

Huawai et al: "Small data transmission with RA-based schemes", 3GPP Draft; R2-2006583, vol. RAN WG2, Aug. 7, 2020.

Vivo: "Supporting Small Data Transmission via RA Procedure", 3GPP Draft; R2-2006551, vol. RAN WG2, Aug. 7, 2020.

IN Office Action for Indian Patent Application No. 202317012742, malled on Jun. 28, 2024.

LG Electronics Inc., "Inter-RAT mobility between NR and eLTE for Inactive state", 3GPP TSG-RAN WG2 Meeting #101, R2-1802922, Athens, Greece, Feb. 26-Mar. 2, 2018, pp. 1-3.

Huawei, HiSilicon, "On the support of periodical RNA update without context relocation", 3GPP TSG-RAN WG2 Meeting #101, R2-1802794 Athens, Greece, Feb. 26-Mar. 2, 2018, pp. 1-4.

CATT, "Small data transmission in inactive state", 3GPP TSG-RAN WG2 Meeting #95bis, R2-166118, Kaohsiung, Oct. 10-14, 2016, pp. 1-4.

International Search Report for PCT/CN2020/115425 dated May 26, 2021 [PCT/ISA/210].

Written Opinion for PCT/CN2020/115425 dated May 26, 2021 [PCT/ISA/237].

JP Office Action for JP Application No. 2023-516517, mailed on Mar. 19, 2024 with English Translation.

ZTE Corporation, Sanechips, "Details of RRC-based IDT", 3GPP TSG RAN WG2 #111e R2-2007449, Aug. 6, 2020, pp. 1-pp. 18.

3GPP, "3GPP TS 38.423 V16.2.0 (Jul. 2020)", Jul. 17, 2020, pp. 1-pp. 447.

* cited by examiner

METHOD, DEVICE AND COMPUTER STORAGE MEDIUM OF COMMUNICATION

CROSS REFERENCE TO RELATED APPLICATIONS

This application is a National Stage of International Application No. PCT/CN2020/115425 filed Sep. 15, 2020.

TECHNICAL FIELD

Embodiments of the present disclosure generally relate to the field of telecommunication, and in particular, to methods, devices and computer storage media of communication for data transmission in an inactive state of a terminal device.

BACKGROUND

Typically, a terminal device in an inactive state may still have small and infrequent data traffic (also referred to as small data transmission (SDT) hereinafter) to be transmitted. Until the third generation partnership project (3GPP) Release 16, the inactive state cannot support data transmission, and the terminal device has to resume connection (i.e., enter a connected state) for any downlink and uplink data. Connection setup and subsequently release to the inactive state happens for each data transmission whatever small and infrequent the data packets are. This will result in unnecessary power consumption and signaling overhead.

In this event, 3GPP Release 17 has approved SDT based on a random access channel (RACH) in the inactive state and also approved SDT based on pre-configured physical uplink shared channel (PUSCH) resources in the inactive state. Thereby, the signaling overhead can be reduced. In this case, how to perform SDT has become a hot issue.

SUMMARY

In general, embodiments of the present disclosure provide methods, devices and computer storage media for communication.

In a first aspect, there is provided a method of communication. The method comprises: determining, at a terminal device in an inactive state, whether one or more data radio bearers (DRBs) with uplink data to be transmitted support data transmission in the inactive state; in accordance with a determination that the one or more DRBs support the data transmission in the inactive state, determining, based on a payload size associated with the uplink data and a threshold associated with the one or more DRBs, whether the uplink data is to be transmitted in the inactive state; and in accordance with a determination that the uplink data is to be transmitted in the inactive state, transmitting the uplink data to a first network device in the inactive state.

In a second aspect, there is provided a method of communication. The method comprises: receiving, at a first network device, uplink data transmitted by a terminal device in an inactive state; and transmitting, to a third network device, a request for relocating an anchor for a context of the terminal device, the request comprising a first indication as to whether there is remaining data to be transmitted, the third network device maintaining the context of the terminal device.

In a third aspect, there is provided a method of communication. The method comprises: receiving, at a second network device and from a terminal device, a first request for resuming connection upon cell reselection of the terminal device from a first cell of a first network device to a second cell of the second network device during data transmission in an inactive state of the terminal device; and transmitting, to a fourth network device maintaining the context of the terminal device, a second request for relocating an anchor for a context of the terminal device.

In a fourth aspect, there is provided a method of communication. The method comprises: receiving, at a third network device and from a first network device, a request for relocating an anchor for a context of a terminal device in an inactive state, the request comprising a first indication as to whether there is remaining data other than uplink data to be transmitted, the third network device maintaining the context of the terminal device; determining, based on the first indication, whether the anchor is to be relocated; and in accordance with a determination that the anchor is not to be relocated, transmitting, to the first network device, at least a part of the context for transmission of the uplink data in the inactive state.

In a fifth aspect, there is provided a method of communication. The method comprises: receiving, at a fourth network device and from a second network device, a second request for relocating an anchor for a context of a terminal device, the fourth network device maintaining the context; in accordance with a determination that the anchor is to be relocated, transmitting, to the second network device, information about sequence number and hyper frame number of data packets associated with uplink data to be transmitted; and transmit the data packets to the second network device.

In a sixth aspect, there is provided a terminal device. The terminal device comprises a processor and a memory coupled to the processor. The memory stores instructions that when executed by the processor, cause the terminal device to perform the method according to the first aspect of the present disclosure.

In a seventh aspect, there is provided a first network device. The first network device comprises a processor and a memory coupled to the processor. The memory stores instructions that when executed by the processor, cause the first network device to perform the method according to the second aspect of the present disclosure.

In an eighth aspect, there is provided a second network device. The second network device comprises a processor and a memory coupled to the processor. The memory stores instructions that when executed by the processor, cause the second network device to perform the method according to the third aspect of the present disclosure.

In a ninth aspect, there is provided a third network device. The third network device comprises a processor and a memory coupled to the processor. The memory stores instructions that when executed by the processor, cause the transmitting device to perform the method according to the fourth aspect of the present disclosure.

In a tenth aspect, there is provided a fourth network device. The fourth network device comprises a processor and a memory coupled to the processor. The memory stores instructions that when executed by the processor, cause the fourth network device to perform the method according to the fifth aspect of the present disclosure.

In an eleventh aspect, there is provided a computer readable medium having instructions stored thereon. The instructions, when executed on at least one processor, cause the at least one processor to perform the method according to the first aspect of the present disclosure.

In a twelfth aspect, there is provided a computer readable medium having instructions stored thereon. The instructions, when executed on at least one processor, cause the at least one processor to perform the method according to the second aspect of the present disclosure.

In a thirteenth aspect, there is provided a computer readable medium having instructions stored thereon. The instructions, when executed on at least one processor, cause the at least one processor to perform the method according to the third aspect of the present disclosure.

In a fourteenth aspect, there is provided a computer readable medium having instructions stored thereon. The instructions, when executed on at least one processor, cause the at least one processor to perform the method according to the fourth aspect of the present disclosure.

In a fifteenth aspect, there is provided a computer readable medium having instructions stored thereon. The instructions, when executed on at least one processor, cause the at least one processor to perform the method according to the fifth aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
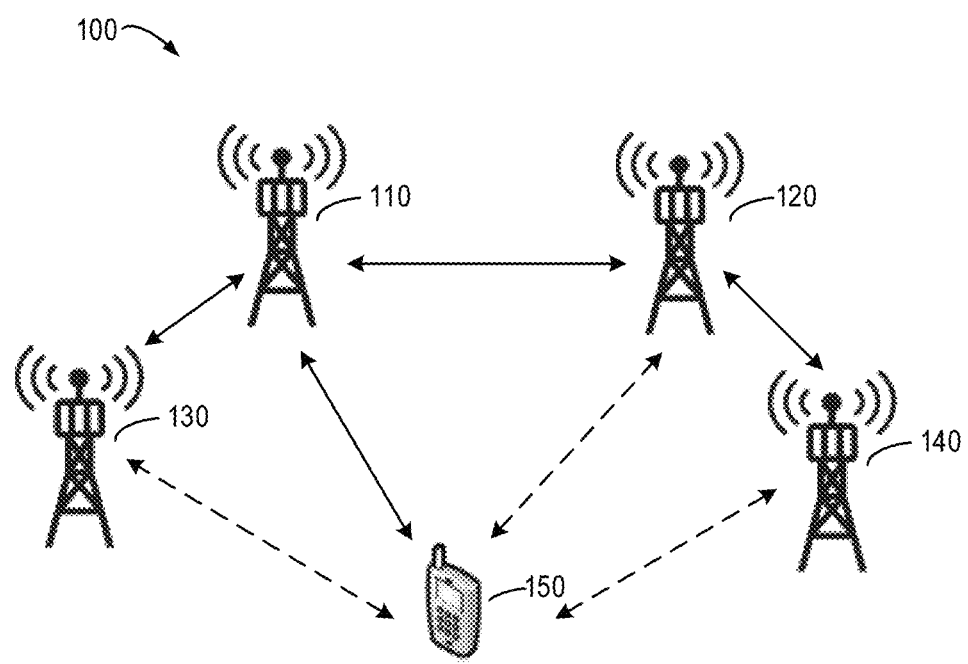
FIG. 1 illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device or the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

Currently, there are various applications that involve exchange of small and infrequency data. For example, in some applications of mobile devices, SDT may include traffic from Instant Messaging (IM) services, heart-beat or keep-alive traffic, for example, from IM or email clients and other services, push notifications in various applications, traffic from wearables (including, for example, periodic positioning information), and/or the like. In some applications of non-mobile devices, SDT may include sensor data (e.g., temperature, pressure readings transmitted periodically or in an event-triggered manner in an IoT network), metering and alerting information sent from smart meters, and/or the like.

As mentioned above, 3GPP Release 17 has approved SDT based on a RACH in the inactive state and SDT based on pre-configured PUSCH resources in the inactive state. In this case, more details about implementation of SDT need to be studied. In addition, how to support lossless data transmission upon cell reselection during SDT also needs to be studied.

In view of this, embodiments of the present disclosure provide a solution for communication during SDT. The solution can achieve enhancement on SDT and also achieve lossless transmission for SDT during mobility. Principles and implementations of the present disclosure will be described in detail below with reference to the figures.

Example of Communication Network

FIG. 1 illustrates a schematic diagram of an example communication network 100 in which some embodiments of the present disclosure can be implemented. As shown in FIG. 1, the communication network 100 may include a first network device 110, a second network device 120, a third network device 130, a fourth network device 140 and a terminal device 150. The terminal device 150 may be served by any of the first network device 110, the second network device 120, the third network device 130 and the fourth network device 140. It is to be understood that the number of devices in FIG. 1 is given for the purpose of illustration without suggesting any limitations to the present disclosure. The communication network 100 may include any suitable number of network devices and/or terminal devices adapted for implementing implementations of the present disclosure.

As shown in FIG. 1, the first network device 110 may communicate with the terminal device 150 via a channel such as a wireless communication channel. Similarly, each of the second, third and fourth network devices 120, 130 and 140 may also communicate with the terminal device 150 via a channel such as a wireless communication channel. The first, second, third and fourth network devices 110, 120, 130 and 140 may communicate with each other.

The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Each of the first, second, third and fourth network devices 110, 120, 130 and 140 may have at least one cell (not shown). In some scenarios, in an earlier stage, the terminal device 150 is served by the third network device 130 in a connected state, and the third network device 130 maintains a context for the terminal device 150. In some cases, the third network device 130 may instruct the terminal device 150 to enter into an inactive state, and then the terminal device 150 may enter into the inactive state. During the terminal device 150 is moving toward the first network device 110, the terminal device 150 is switched to be served by the first network device 110. In this case, the third network device 130 may be the last serving network device maintaining the context for the terminal device 150. In some embodiments, the first network device 110 may be the last serving network device maintaining the context for the terminal device 150.

In some other scenarios, due to the movement of the terminal device 150, the terminal device 150 may perform a cell reselection from one cell to another cell during the inactive state. For example, the terminal device 150 may perform the cell reselection from a first cell of the first network device 110 to a second cell of the second network device 120 during the inactive state. For convenience, assuming that upon the cell reselection, the fourth network device 140 is the last serving network device maintaining the context for the terminal device 150. In some embodiments, the fourth network device 140 may be the first network device 110 per se. In some embodiments, the fourth network device 140 may be the third network device 130 per se.

Figure 2:
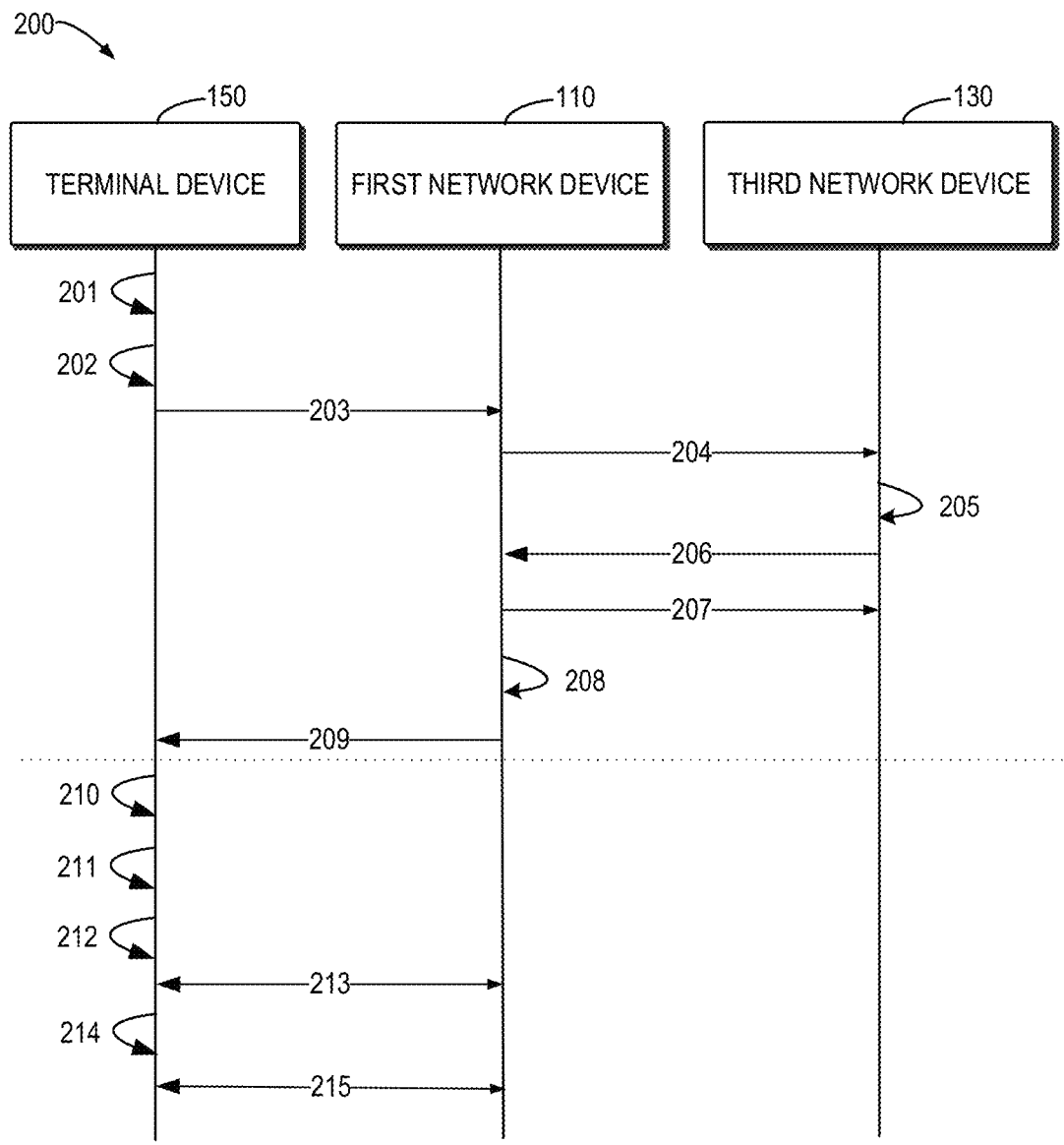
FIG. 2 illustrates a schematic diagram illustrating a process for communication during SDT according to embodiments of the present disclosure.

Embodiments of the present application provide improve solutions for communication in these scenarios. It will be described below with reference to FIGS. 2 and 3. FIG. 2 illustrates a schematic diagram illustrating a process 200 for communication during SDT according to embodiments of the present disclosure. For the purpose of discussion, the process 200 will be described with reference to FIG. 1. The process 200 may involve the terminal device 150 and the first and third network devices 110 and 130 as illustrated in FIG. 1. In this example, assuming that the terminal device 150 is currently served by the first network device 110 and is in an inactive state.

Decision and Performance of SDT

As shown in FIG. 2, if there is new uplink data from one or more DRBs, the terminal device 120 determines 201 whether the one or more DRBs support SDT. In some embodiments, the terminal device 120 may receive, from the first network device 110, a signaling indicating whether SDT is allowed by the first network device 110 for a DRB, and determine, based on the received signaling, whether the one or more DRBs support SDT. In some embodiments, the signaling may be an RRCReconfiguration message. Alternatively, in some embodiments, the signaling may be an RRCRelease message. Of course, any other suitable signaling is also feasible.

If all the DRBs support SDT, the terminal device 120 determines 202, based on a payload size associated with the uplink data and a threshold associated with the one or more DRBs, whether the uplink data is to be transmitted in the inactive state. In some embodiments, the threshold may be configured by the first network device 110. For example, the threshold may be broadcasted in a system message from the first network device 110. As another example, the threshold may be configured to the terminal device 150 dedicatedly using a RRC message e.g. a RRCReconfiguration message or a RRCRelease message.

In some embodiments, the threshold may be configured per terminal device. For example, a first threshold size is configured for the terminal device 150. In some embodiments, the terminal device 150 may determine a total payload size of the uplink data. If determining that the total payload size is less than the first threshold size, the terminal device 150 may determine that the uplink data is to be transmitted in the inactive state.

In some embodiments, the threshold may be configured per DRB. For example, a second threshold size is configured for a DRB. In some embodiments, only one DRB may be allowed for SDT. Of course, more than one DRB may also be allowed for SDT. In some embodiments, the second threshold size is commonly set for each of the DRBs. In these embodiments, the terminal device 150 may determine a payload size of data in the uplink data corresponding to each of the DRBs. If the payload size is less than the second threshold size, the terminal device 150 may determine that the uplink data is to be transmitted in the inactive state. In some alternative embodiments, the second threshold size is independently set for each of the DRBs. In these embodiments, the terminal device 150 may determine a payload size of data in the uplink data corresponding to each of the DRBs. If the payload size is less than the corresponding second threshold size, the terminal device 150 may determine that the uplink data is to be transmitted in the inactive state.

If determining that the uplink data is to be transmitted in the inactive state, the terminal device 150 transmits 203 the uplink data to the first network device 110. In some embodiments, the terminal device 150 may perform a RACH procedure such as a 4-step or 2-step RACH procedure to transmit the uplink data. For example, if the terminal device 150 makes a decision on performing RACH based SDT, the terminal device 150 may resume at least DRBs with the uplink data, and initiate a 4-step or 2-step RACH procedure with the uplink data multiplexed with RRC Resume Request message in message 3 (msg 3) of the 4-step RACH procedure or message A (msg A) of the 2-step RACH procedure.

In some embodiments, the terminal device 150 may receive a configuration about a bandwidth part (BWP) for SDT from the first network device 110, and perform a RACH procedure based on the BWP configuration for transmission of the uplink data. In this way, traffic load on an initial BWP can be significantly alleviated. In some embodiments, one or more BWPs other than the initial BWP may be dedicatedly configured for SDT.

In some embodiments, the BWP configuration can be broadcasted in a system message from the first network device 110. Alternatively, the BWP configuration can be configured to the terminal device 150 via a dedicated signaling. For example, the dedicated signaling may be RRCRelease message. Of course, any other suitable signaling is also feasible.

In some embodiments, the terminal device 150 may also transmit the uplink data via a pre-configured uplink resource for SDT (also referred to as CG based SDT). It should be noted that any other suitable ways may also be used for transmission of the uplink data, and the present application does not make limitation for this.

In some embodiments, the terminal device 150 may also transmit an indication as to whether remaining data other than the uplink data is to be transmitted. In some embodiments, the terminal device 150 may transmit a buffer status report (BSR) to indicate whether the remaining data presents. In this way, it is helpful for a network device to make decision on whether to perform anchor relocation for a context of the terminal device 150. For example, the terminal device 150 may transmit the indication in msg 3 of the 4-step RACH procedure or msg A of the 2-step RACH procedure.

Processing of Anchor Relocation for SDT

Upon receipt of the uplink data transmitted by the terminal device 150, the first network device 110 may transmit 204, to the third network device 130, a request for relocating an anchor for a context of the terminal device 150. The third network device 130 is the last serving network device maintaining the context. For example, the first network device 110 may determine whether it per se is a new network device other than the last serving network device. If determining that it per se is the new network device, the first network device 110 may transmit the request to the third network device 130 serving as the last serving network device.

For example, the first network device 110 may transmit a RETRIEVE UE CONTEXT REQUEST message to the third network device 130. In some embodiments, the request comprises a first indication as to whether there is remaining data to be transmitted. In other words, the first indication indicates whether there is a one-shot SDT. In this way, whether there is the remaining data to be transmitted can be explicitly indicated to the last serving network device. For example, the first indication may be one bit. The first value of the bit may indicate that there is the remaining data, and the second value of the bit may indicate that there is no remaining data. Of course, any other suitable ways are also feasible.

In some alternative embodiments, the indication may comprise user plane transport network layer (UP TNL) information for downlink transmission. With the information, the indication indicates that there is no remaining data. In some alternative embodiments, the indication may comprise the BSR from the terminal device 150 for implicitly indicating whether there is the remaining data to be transmitted.

Upon receipt of the request for relocating the anchor, the third network device 130 determines 205 whether the anchor is relocated based on the first indication in the request.

In some embodiments, if the first indication indicates that there is no remaining data, i.e., this is a one-shot SDT, the third network device 130 may decide whether to relocate the context or not. In some embodiments, if the first indication indicates that there is the remaining data, i.e., this is not a one-shot SDT, the third network device 130 may relocate the anchor to the first network device 110. The reason is that for the non-one-shot SDT, the msg4 of the 4-step RACH procedure or msg B of the 2-step RACH procedure should be generated by the new network device using SRB1, thus the context is required.

If anchor relocation is performed, the third network device 130 may transmit a response to the request comprising the context to the first network device 110. For example, the third network device 130 may transmit a RETRIEVE UE CONTEXT RESPONSE message to the first network device 110.

If anchor relocation is not performed, the third network device 130 may transmit 206, to the first network device 110, at least a part of the context for transmission of the uplink data in the inactive state. Then, the first network device 110 may transmit 207 data packets associated with the uplink data to the third network device 130 based on the part of the context, and release 208 the context of the terminal device 150.

In some embodiments, the third network device 130 may transmit, to the first network device 110, a message comprising a connection release message to be transmitted to the terminal device 150, UP TNL information for uplink transmission and a part of the context comprising at least radio link control (RLC) configuration of the terminal device 150. For example, the third network device 130 may feedback a RETRIEVE UE CONTEXT FAILURE message with an encapsulated RRCRelease message, UP TNL information for uplink data, and part of the context with at least RLC configuration of the terminal device 150. Then the first network device 110 may establish RLC entity according to the RLC configuration. After RLC processing, the first network device 110 may transmit one or more UL PDCP PDUs to the third network device 130. The third network device 130 may perform service data adaptation protocol (SDAP) and PDCP processing of the uplink data and then transmit it to the core network. If there is further downlink (DL) data, the third network device 130 may perform SDAP and PDCP processing of the further downlink data and then transmit one or more DL PDCP PDUs to the first network device 110. The first network device then transmits the DL data together with the RRCRelease message to the terminal device 150. The first network device 110 also release the part of the context.

In some embodiments, the third network device 130 may transmit, to the first network device 110, a response to the request, the response comprising the context and a second indication that the anchor is not relocated. For example, the third network device 130 may feedback a RETRIEVE UE CONTEXT RESPONSE message with the context and the second indication. As another example, the third network device 130 may feedback a RETRIEVE UE CONTEXT RESPONSE message with the context and the UP TNL information for uplink transmission. If the response implies that the anchor is not relocated, the first network device 110 may establish RLC entities according to the context, and transmit one or more UL PDCP PDUs to the third network device 130 after RLC processing. If DL data is received by the third network device 130, the third network device 130 may transmit DL PDCP PDUs after SDAP and PDCP processing to the first network device 110. The first network device 110 send DL data to the terminal device 150 after RLC and MAC processing.

In some embodiments, the first network device 110 may establish RLC, PDCP and SDAP entities for the one or more DRBs, and transmit the UL data to the third network device 130 after RLC, PDCP and SDAP processing. If DL data is received by the third network device 130, the third network device 130 may transmit the DL data to the first network device 110.

The first network device 110 may generate a RRC message such as RRCRelease message and transmit 209 the RRC message to the terminal device 150 with or without downlink data associated with the uplink data. In some embodiments, the downlink data may be transmitted to the terminal device 150 together with the RRC message in msg 4 of a 4-step RACH procedure or msg B of a 2-step RACH procedure. The first network device 110 shall releases the context after the SDT procedure.

Processing of New Uplink Transmission During SDT

During SDT, if there is a new uplink transmission (also referred to as a further uplink transmission herein), the terminal device 150 may process the further uplink transmission according to whether it is new uplink data or signaling and whether a DRB (also referred to as a further DRB) with the new uplink data supports SDT.

In some embodiments, the terminal device 150 may determine 210 whether further uplink transmission comprises an uplink signaling. If determining that the further uplink transmission comprises the uplink signaling, the terminal device 150 may suspend 212 DRBs associated with the terminal device 150, and perform 213 the further uplink transmission in a connected state based on a RACH procedure. For example, the terminal device 150 may reset a media access control (MAC) entity, suspend all the DRBs that are not suspended, initiate a RRC Resume procedure for normal data transmission. Upon receipt of a RRCResume message from the first network device 110, the terminal device 150 may perform RLC re-establishment and PDCP re-establishment as indicated in the RRCResume message. In some embodiments, the terminal device 150 may transmit, to the first network device 110, a PDCP status report for a DRB in an acknowledge mode (AM) of the RLC layer. In some embodiments, the terminal device 150 may also perform, in the connected state and based on the RACH procedure, transmission of data in the uplink data that is not transmitted successfully. In some embodiments, the terminal device 150 may cannel the transmission of data in the uplink data that is not transmitted successfully.

If determining that the further uplink transmission does not comprise the uplink signaling, i.e., the further uplink transmission comprises further uplink data, the terminal device 150 may determine 211 whether the further DRB with the further uplink data is different from each of the current DRBs and the further DRB supports SDT, and if determining that the further DRB does not support SDT, the terminal device 150 may suspend 212 DRBs associated with the terminal device 150, and perform 213 the further uplink transmission in a connected state based on a RACH procedure. For example, the terminal device 150 may reset a MAC entity, suspend all the DRBs that are not suspended, initiate a RRC Resume procedure for normal data transmission. Upon receipt of a RRCResume message from the first network device 110, the terminal device 150 may perform RLC re-establishment and PDCP re-establishment as indicated in the RRCResume message. In some embodiments, the terminal device 150 may transmit, to the first network device 110, a PDCP status report for a DRB in an AM of the RLC layer. In some embodiments, the terminal device 150 may also perform, in the connected state and based on the RACH procedure, transmission of data in the uplink data that is not transmitted successfully. In some embodiments, the terminal device 150 may cannel the transmission of data in the uplink data that is not transmitted successfully.

In some embodiments, if determining that the further DRB is different from each of the current DRBs and supports SDT, the terminal device 150 may determine 214 whether the further uplink transmission is to be performed in the inactive state. In some embodiments, the terminal device 150 may determine whether the further uplink transmission and transmission of data in the uplink data that is not transmitted successfully (also referred to as unfinished data transmission herein) fulfills the condition for SDT. Similar to decision on SDT for the uplink data, the terminal device 150 may determine a total payload size of the further uplink transmission and the unfinished data transmission and if determining that the total payload size is less than a threshold, the terminal device 150 may determine that the further uplink transmission is to be performed in the inactive state. Other details are omitted for concise here.

If determining that the further uplink transmission is to be performed in the inactive state, the terminal device 150 may perform 215 the further uplink transmission in the inactive state. In some embodiments, the terminal device 150 may resume the further DRB, reset MAC entity, release MAC cell group configuration, perform RLC re-establishment for DRBs not suspended, and initiate a SDT procedure for performing the further uplink transmission. In some embodiments, the terminal device 150 may also perform, in the inactive state, the transmission of data in the uplink data that is not transmitted successfully. In some embodiments, the terminal device 150 may cannel the transmission of data in the uplink data that is not transmitted successfully.

If determining that the further uplink transmission is not to be performed in the inactive state, the terminal device 150 may suspend DRBs associated with the terminal device 150, and perform the further uplink transmission in a connected state based on a RACH procedure. In some embodiments, the terminal device 150 may perform the further uplink transmission upon entrance of an idle state. Alternatively, the terminal device 150 may reset the MAC entity and release MAC cell group configuration for the MAC entity, release all RLC and PDCP entities, and initiate RRC establishment procedure for the further uplink transmission by transmitting a RRC setup Request message to the first network device 110. Of course, the terminal device 150 may also initiate a RRC Resume procedure for normal data transmission for the further uplink transmission after the current SDT transmission.

In some alternative embodiments, during SDT, no matter it is a RACH based SDT, CG based SDT or subsequent SDT, if there is new uplink data from a DRB that does not support (i.e., is not configured with) SDT, or if there is new uplink signaling arriving, or if there is new uplink data from other DRBs than the current DRBs, the terminal device 150 may perform the further uplink transmission upon entrance of an idle state. Alternatively, the terminal device 150 may reset the MAC entity and release MAC cell group configuration for the MAC entity, release all RLC and PDCP entities, and initiate RRC establishment procedure for the further uplink transmission by transmitting a RRC setup Request message to the first network device 110. Of course, the terminal device 150 may also initiate a RRC Resume procedure for normal data transmission for the further uplink transmission after the current SDT transmission.

In this way, lossless transmission in case of new uplink transmission from other DRB can be supported.

Processing Upon Cell Reselection During SDT

Figure 3:
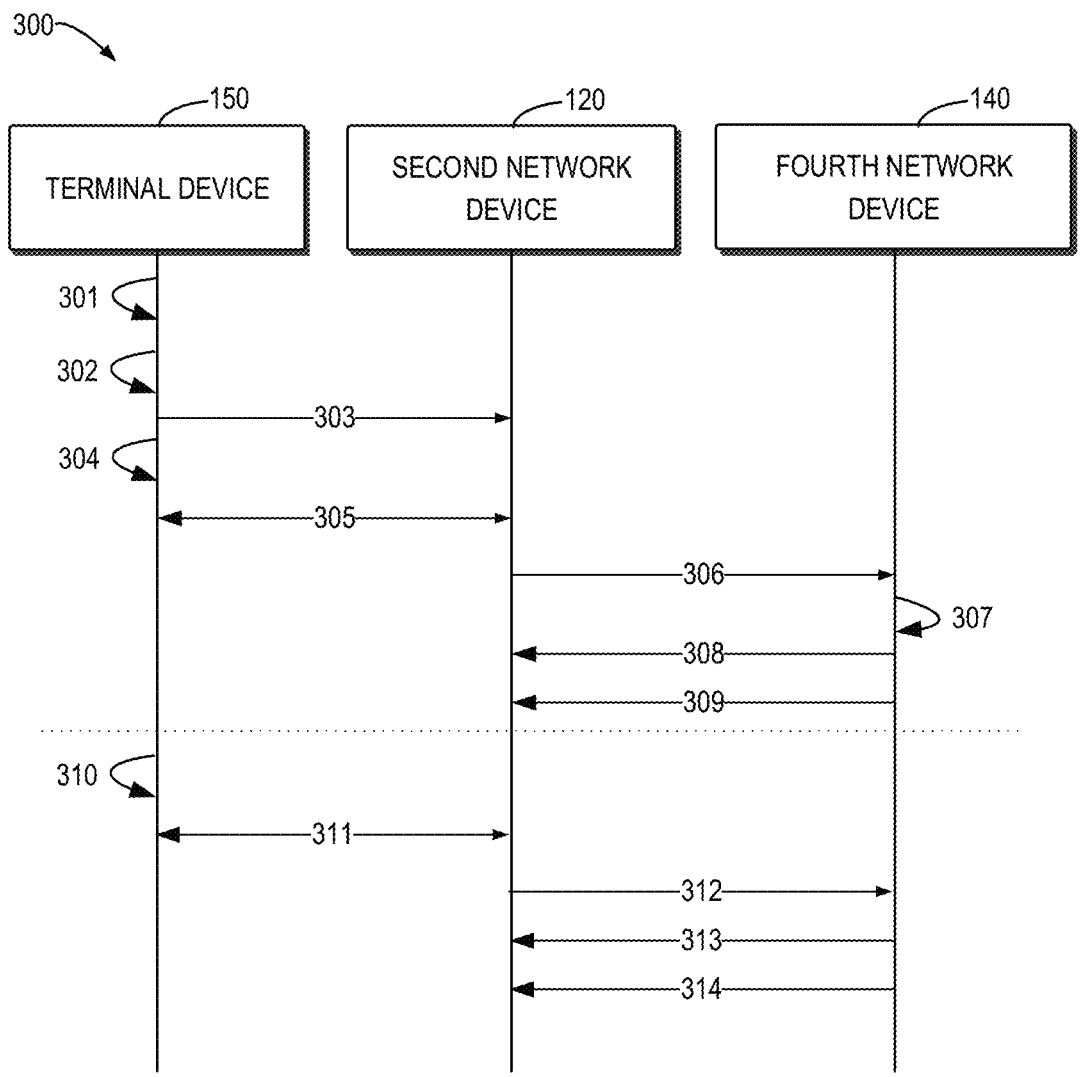
FIG. 3 illustrates a schematic diagram illustrating a process for communication upon cell reselection according to embodiments of the present disclosure.

When the terminal device 150 is performing SDT, no matter it is a RACH based SDT, CG based SDT or subsequent SDT, upon cell reselection from a current cell (also referred to as a first cell herein) to a new cell (also referred to as a second cell herein) happens, the terminal device may check whether the second cell supports SDT, that is, whether SDT is allowed in the second cell. It will be described in detail with reference to FIG. 3. FIG. 3 illustrates a schematic diagram illustrating a process 300 for communication upon cell reselection according to embodiments of the present disclosure. For the purpose of discussion, the process 300 will be described with reference to FIG. 1. The process 300 may involve the terminal device 150 and the second and fourth network devices 120 and 140 as illustrated in FIG. 1. In this example, assuming that a serving cell of the terminal device 150 in the inactive state is reselected from the first cell of the first network device 110 to the second cell of the second network device 120 and the fourth network device 140 is the last serving network device maintaining a context of the terminal device 150.

New Cell Supporting SDT

As shown in FIG. 3, the terminal device 150 may determine 301 whether SDT can be performed in the second cell. In some embodiments, the terminal device 150 may determine whether the second cell supports SDT and whether the condition for SDT is satisfied. If the terminal device 150 determines that the second cell supports SDT and the condition for SDT is satisfied, the terminal device 150 may determine that SDT can be performed in the second cell. For example, the terminal device 150 may determine whether the second cell supports SDT based on a system message from the second network device 120. As a further example, the terminal device 150 may determine whether the condition for SDT is satisfied based on a payload size of data in the uplink data that is not transmitted successfully. This is merely an example, and the present application does not make limitation for this.

If determining that SDT can be performed in the second cell, the terminal device 150 may maintain 302 in the inactive state. In some embodiments, while maintaining in the inactive state, the terminal device 150 may reset a MAC entity of a MAC layer of the terminal device 150. In some embodiments, the terminal device 150 may release a MAC cell group configuration for the MAC entity. In some embodiments, the terminal device 150 may perform a re-establishment of a RLC entity of a RLC layer of the terminal device 150 for DRBs associated with the terminal device 150 that are not suspended. In some embodiments, the terminal device 150 may perform a re-establishment of a PDCP entity of a PDCP layer of the terminal device 150 for the DRBs associated with the terminal device 150 that are not suspended.

Then the terminal device 150 may transmit 303 the uplink data to the second cell in the inactive state. In some embodiments, the terminal device 150 may initiate SDT procedure in the second cell as that in the first cell (i.e., the first network device 110) described previously. For example, the terminal device 150 may transmit a request (also referred to as a first request herein) for resuming connection to the second network device 120. As an example, the terminal device 150 may transmit a RRC Resume Request message. In some embodiments, the terminal device 150 may transmit, to the second cell, a PDCP status report for a RLC AM DRB.

Upon receipt of the first request from the terminal device 150, the second network device 120 may determine whether it per se is a new network device serving the terminal device 150. If determining that it per se is the new network device, the second network device 120 may transmit 306, to the fourth network device 140, a second request for relocating an anchor for the context of the terminal device 150. In some embodiments, the second request may comprise UP TNL information for uplink and downlink transmission (i.e., UP TLN information for data forwarding). For example, the second network device 120 may transmit a RETREVE UE CONTEXT REQUEST message comprising the UP TNL information for data forwarding. Of course, any other suitable messages are also feasible.

Upon receipt of the second request for relocating the anchor, the fourth network device 140 may determine 307 whether the anchor is to be relocated. If the fourth network device 140 determines that the anchor is to be relocated, that is, decides to perform anchor relocation, the fourth network device 140 may transmit 308, to the second network device 120, information about SN and HFN of data packets associated with the uplink data. In other words, the fourth network device 140 may transmit the uplink and downlink PDCP SN and HFN status information, i.e., the SN and HFN information concerning uplink data packets from the terminal device 150 that has not been transmitted to the core network and downlink data packets from the core network that has not been transmitted to the terminal device 150 successfully.

In some embodiments, the fourth network device 140 may transmit the SN and HFN information in a response to the second request to the second network device 120, the response comprising the context. For example, the fourth network device 140 may transmit the SN and HFN information in the RETRIEVE UE CONTEXT RESPONSE message. In some alternative embodiments, the fourth network device 140 may transmit the SN and HFN information in a message dedicated for transmission of the information. For example, the fourth network device 140 may transmit a RETRIEVE UE CONTEXT RESPONSE message comprising the context, and also transmit the SN and HFN information in a SN STATUS TRANSFER message. Of course, any other suitable messages are also feasible, and the present application is limited to the above examples.

In some embodiments where the second request for relocating the anchor does not comprise UP TNL information for data forwarding, the fourth network device 140 may transmit, to the second network device 120, a request (also referred to as a third request herein) for obtaining the UP TNL information for data forwarding. In some embodiments, the third request may comprise a PDU session identity (ID) associated with the UP TNL information for data forwarding. In some alternative or additional embodiments, the third request may comprise a DRB ID list associated with the UP TLN information for data forwarding.

In some embodiments, the third request may be comprised in a response to the second request. For example, the third request may be comprised in the RETRIEVE UE CONTEXT RESPONSE message. Of course, the third request also can be transmitted in any other suitable messages.

Upon receipt of the third request, the second network device 120 may transmit the UP TNL information for data forwarding to the fourth network device 140. In some embodiments where the third request comprises the PDU session ID, the second network device 120 may transmit the UP TNL information for the PDU session ID to the fourth network device 140. In some embodiments where the third request comprises the DRB ID list, the second network device 120 may transmit the UP TNL information for the DRB ID list to the fourth network device 140. In some embodiments, the second network device 120 may transmit the UP TNL information for data forwarding to the fourth network device 140 via a XN-U ADDRESS INDICATION message. Of course, any other suitable messages are also feasible.

Then the fourth network device 140 may perform 309 a data forwarding procedure to forward the data packets from the fourth network device 140 to the second network device 120. The data packets may involve uplink data packets from the terminal device 150 that has not been transmitted to the core network and downlink data packets from the core network that has not been transmitted to the terminal device 150 successfully.

If the fourth network device 140 determines that the anchor is not to be relocated, that is, the fourth network device 140 decides not to perform anchor relocation, the fourth network device 140 may transmit, to the second network device 120, at least a part of the context. Accordingly, the second network device 120 may transmit data packets associated with the uplink data to the fourth network device 140 based on the part of the context, and release the context of the terminal device 150.

In some embodiments, the fourth network device 140 may transmit, to the second network device 120, a message comprising a connection release message to be transmitted to the terminal device 150, UP TNL information for uplink transmission and a part of the context comprising at least RLC configuration of the terminal device 150. For example, the fourth network device 140 may feedback a RETRIEVE UE CONTEXT FAILURE message with encapsulated RRCRelease message, UP TNL information, and part of the context with at least RLC configuration of the terminal device 150. Accordingly, the second network device 120 may forward the RRCRelease message to the terminal device 150. Then the second network device 120 may establish RLC entity according to the RLC configuration. After RLC processing, the second network device 120 may transmit one or more UL PDCP PDUs to the fourth network device 140. Then the second network device 120 may release the context. The fourth network device 140 may perform SDAP and PDCP processing of the uplink data and then transmit it to the core network. If there is further downlink data, the fourth network device 140 may perform SDAP and PDCP processing of the further downlink data and then transmit one or more DL PDCP PDUs to the second network device 120.

In some embodiments, the fourth network device 140 may transmit, to the second network device 120, a response to the request, the response comprising the context and a second indication that the anchor is not relocated. For example, the third network device 130 may feedback a RETRIEVE UE CONTEXT RESPONSE message with the context and the second indication. As another example, the fourth network device 140 may feedback a RETRIEVE UE CONTEXT RESPONSE message with the context and the UP TNL information for uplink transmission. If the response implies that the anchor is not relocated, the second network device 120 may establish RLC entities according to the context, and transmit one or more UL PDCP PDUs to the fourth network device 140 after RLC processing.

The second network device 120 may generate a RRC message such as RRCRelease message and transmit the RRC message to the terminal device 150 with or without downlink data associated with the uplink data. In some embodiments, the downlink data may be transmitted to the terminal device 150 together with the RRC message in msg 4 of a 4-step RACH procedure or msg B of a 2-step RACH procedure.

New Cell not Supporting SDT

If determining that the second cell does not support SDT, the terminal device 150 may suspend 310 DRBs associated with the terminal device 150 while maintaining in the inactive state. Then the terminal device 150 may perform 311 a RACH procedure for transmission of the uplink data in a connected state. For example, the terminal device 150 may maintain in the inactive state and reset a MAC entity, suspend all the DRBs not suspended, and initiate a RRC Resume procedure for normal data transmission. Upon receipt of a RRCResume message from the second network device 120, the terminal device 150 may perform a RLC re-establishment, PDCP re-establishment for the DRBs as indicated in the RRCResume message.

Upon receipt of the first request from the terminal device 150, the second network device 120 may determine whether it per se is a new network device serving the terminal device 150. If determining that it per se is the new network device, the second network device 120 may transmit 312, to the fourth network device 140, a second request for relocating an anchor for the context of the terminal device 150. In some embodiments, the second request may comprise UP TNL information for uplink and downlink transmission (i.e., UP TLN information for data forwarding). For example, the second network device 120 may transmit a RETREVE UE CONTEXT REQUEST message comprising the UP TNL information for data forwarding. Of course, any other suitable messages are also feasible.

Upon receipt of the second request for relocating the anchor, the fourth network device 140 may transmit 313, to the second network device 120, information about SN and HFN of data packets associated with the uplink data. In other words, the fourth network device 140 may transmit the uplink and downlink PDCP SN and HFN status information, i.e., the SN and HFN information concerning uplink data packets from the terminal device 150 that has not been transmitted to the core network and downlink data packets from the core network that has not been transmitted to the terminal device 150.

In some embodiments, the fourth network device 140 may transmit the SN and HFN information in a response to the second request to the second network device 120, the response comprising the context. For example, the fourth network device 140 may transmit the SN and HFN information in the RETRIEVE UE CONTEXT RESPONSE message. In some alternative embodiments, the fourth network device 140 may transmit the SN and HFN information in a message dedicated for transmission of the information. For example, the fourth network device 140 may transmit a RETRIEVE UE CONTEXT RESPONSE message comprising the context, and also transmit the SN and HFN information in a SN STATUS TRANSFER message. Of course, any other suitable messages are also feasible, and the present application is limited to the above examples.

In some embodiments where the second request for relocating the anchor does not comprise UP TNL information for data forwarding, the fourth network device 140 may transmit, to the second network device 120, a request (also referred to as a third request herein) for obtaining the UP TNL information for data forwarding. In some embodiments, the third request may comprise a PDU session identity (ID) associated with the UP TLN information for data forwarding. In some alternative or additional embodiments, the third request may comprise a DRB ID list associated with the UP TLN information for data forwarding.

In some embodiments, the third request may be comprised in a response to the second request. For example, the third request may be comprised in the RETRIEVE UE CONTEXT RESPONSE message. Of course, the third request also can be transmitted in any other suitable messages.

Upon receipt of the third request, the second network device 120 may transmit the UP TNL information for data forwarding to the fourth network device 140. In some embodiments where the third request comprises the PDU session ID, the second network device 120 may transmit the UP TNL information for the PDU session ID to the fourth network device 140. In some embodiments where the third request comprises the DRB ID list, the second network device 120 may transmit the UP TNL information for the DRB ID list to the fourth network device 140. In some embodiments, the second network device 120 may transmit the UP TNL information for data forwarding to the fourth network device 140 via a XN-U ADDRESS INDICATION message. Of course, any other suitable messages are also feasible.

Then the fourth network device 140 may perform 314 a data forwarding procedure to forward the data packets from the fourth network device 140 to the second network device 120. The data packets may involve uplink data packets from the terminal device 150 that has not been transmitted to the core network and downlink data packets from the core network that has not been transmitted to the terminal device 150.

With the process shown in FIG. 3, lossless transmission upon cell reselection during SDT can be supported.

It should be note that actions shown in FIGS. 2 and 3 are not always necessary for implementing embodiments of the present disclosure, and more or less actions may be adapted as needed. Corresponding to the processes described in FIGS. 2 and 3, embodiments of the present disclosure provide methods of communication implemented at a terminal device and network devices. These methods will be described below with reference to FIGS. 4 to 8.

Examples for Methods of Communication

Figure 4:
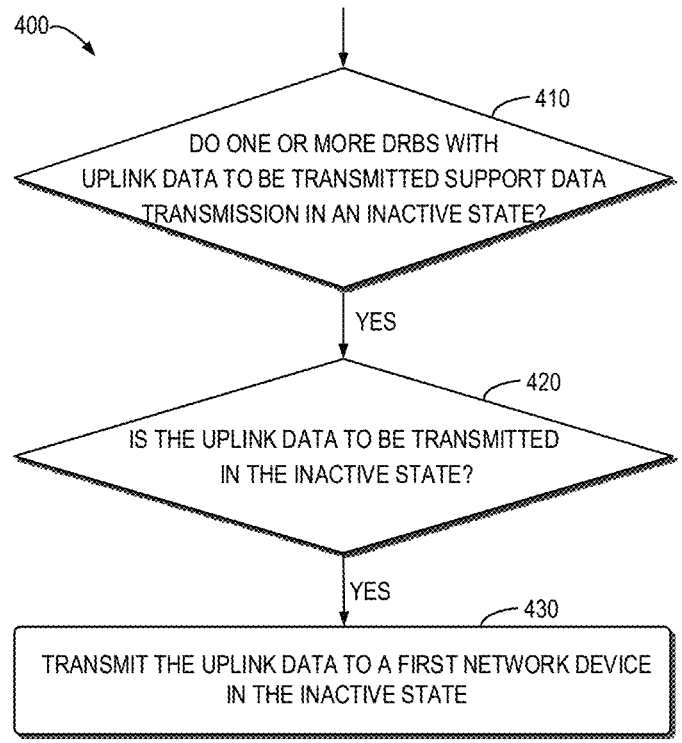
FIG. 4 illustrates an example method of communication implemented at a terminal device in accordance with some embodiments of the present disclosure.

FIG. 4 illustrates an example method 400 of communication implemented at a terminal device in accordance with some embodiments of the present disclosure. For example, the method 400 may be performed at the terminal device 150 as shown in FIG. 1. For the purpose of discussion, in the following, the method 400 will be described with reference to FIG. 1. It is to be understood that the method 400 may include additional blocks not shown and/or may omit some blocks as shown, and the scope of the present disclosure is not limited in this regard.

At block 410, the terminal device 150 determines whether one or more DRBs with uplink data to be transmitted support data transmission in an inactive state of the terminal device 150. That is, the terminal device 150 determines whether the one or more DRBs support SDT.

If the one or more DRBs support the data transmission in the inactive state, at block 420, the terminal device 150 determines whether the uplink data is to be transmitted in the inactive state based on a payload size associated with the uplink data and a threshold associated with the one or more DRBs. In some embodiments, the terminal device 150 may determine a total payload size of the uplink data, and if determining that the total payload size is less than a first threshold size, the terminal device 150 may determine that the uplink data is to be transmitted in the inactive state.

In some alternative embodiments, the terminal device 150 may determine a payload size of data in the uplink data corresponding to each of the one or more DRBs, and if the payload size is less than the second threshold size, the terminal device 150 may determine that the uplink data is to be transmitted in the inactive state. In some additional or alternative embodiments, the second threshold size is set in association with each of the DRBs.

If uplink data is determined to be transmitted in the inactive state, at block 430, the terminal device 150 transmits the uplink data to the first network device 110 in the inactive state. In some embodiments, the terminal device 150 may receive, from the first network device 110, a configuration about a BWP for the data transmission in the inactive state, and perform, based on the configuration, a RACH procedure for transmission of the uplink data. In some embodiments, the terminal device 150 may transmit, to the first network device 110, an indication as to whether remaining data other than the uplink data is to be transmitted.

In some embodiments, the terminal device 150 may determine whether the data transmission in the inactive state can be performed in the second cell upon cell reselection from a first cell of the first network device 110 to the second cell of a second network device 120. In some embodiments, if determining that the data transmission in the inactive state can be performed in the second cell, the terminal device 150 may maintain in the inactive state, and transmit the uplink data to the second cell in the inactive state.

In some additional or alternative embodiments, the terminal device 150 may perform, while maintaining in the inactive state, at least one of the following: a reset of a MAC entity of a MAC layer of the terminal device 150; a release of a MAC cell group configuration for the MAC entity; a re-establishment of a RLC entity of a RLC layer of the terminal device 150 for DRBs associated with the terminal device 150 that are not suspended; or a re-establishment of a PDCP entity of a PDCP layer of the terminal device 150 for the DRBs associated with the terminal device that are not suspended. In some embodiments, the terminal device 150 may further transmit, to the second cell, a PDCP status report for a DRB in an AM of the RLC layer.

In some embodiments, if determining that the data transmission in the inactive state cannot be performed in the second cell, the terminal device 150 may suspend, while maintaining in the inactive state, DRBs associated with the terminal device 150, and perform a RACH procedure for transmission of the uplink data in a connected state.

In some embodiments, the terminal device 150 may determine whether further uplink transmission comprises an uplink signaling. In some embodiments, if determining that the further uplink transmission comprises the uplink signaling, the terminal device 150 may suspend DRBs associated with the terminal device 150, and perform the further uplink transmission in a connected state based on a RACH procedure.

In some embodiments, if determining that the further uplink transmission does not comprise the uplink signaling, the terminal device 150 may determine whether a further DRB with the further uplink transmission is different from each of the one or more DRBs and the further DRB supports the data transmission in the inactive state. In some embodiments, if determining that the further DRB does not support the data transmission in the inactive state, the terminal device 150 may suspend DRBs associated with the terminal device 150, and perform the further uplink transmission in a connected state based on a RACH procedure. In some embodiments, the terminal device 150 may perform, in the connected state and based on the RACH procedure, transmission of data in the uplink data that is not transmitted successfully.

In some embodiments, if determining that the further DRB is different from each of the one or more DRBs and supports the data transmission in the inactive state, the terminal device 150 may determine whether the further uplink transmission is to be performed in the inactive state. In some embodiments, if determining that the further uplink transmission is to be performed in the inactive state, the terminal device 150 may perform the further uplink transmission to the first network device in the inactive state. In some embodiments, the terminal device 120 may perform, in the inactive state, transmission of data in the uplink data that is not transmitted successfully.

Figure 5:
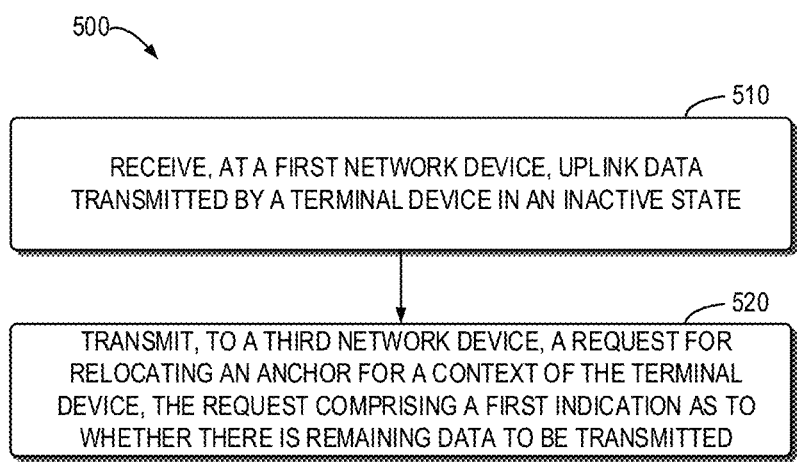
FIG. 5 illustrates an example method of communication implemented at a first network device as a current serving network device in accordance with some embodiments of the present disclosure.

FIG. 5 illustrates an example method 500 of communication implemented at a first network device (i.e., a current serving network device) in accordance with some embodiments of the present disclosure. For example, the method 500 may be performed at the first network device 110 as shown in FIG. 1. For the purpose of discussion, in the following, the method 500 will be described with reference to FIG. 1. It is to be understood that the method 500 may include additional blocks not shown and/or may omit some blocks as shown, and the scope of the present disclosure is not limited in this regard.

As shown in FIG. 5, at block 510, the first network device 110 may receive uplink data transmitted by a terminal device 150 in an inactive state. At block 520, the first network device 110 may transmit, to the third network device 130, a request for relocating an anchor for a context of the terminal device, the request comprising a first indication as to whether there is remaining data to be transmitted, the third network device maintaining the context of the terminal device 150.

In some embodiments, the indication comprises at least one of the following: UP TNL information for downlink transmission; or a BSR from the terminal device 150.

In some embodiments, the first network device 110 may further receive a response to the request from the third network device 130, the response comprising the context and a second indication that the anchor is not relocated. In some embodiments, the first network device 110 may transmit data packets associated with the uplink data to the third network device 130 based on the context, and release the context of the terminal device 150. In some embodiments, the second indication comprises UP TNL information for uplink transmission.

In some embodiments, the first network device 110 may further receive, from the third network device 130, a message comprising a connection release message to be transmitted to the terminal device, UP TNL information for uplink transmission and a part of the context comprising at least RLC configuration of the terminal device 150. In some embodiments, the first network device 110 may transmit the uplink data to the third network device based on the UP TNL information and the RLC configuration, and transmit the connection release message to the terminal device 150.

Figure 6:
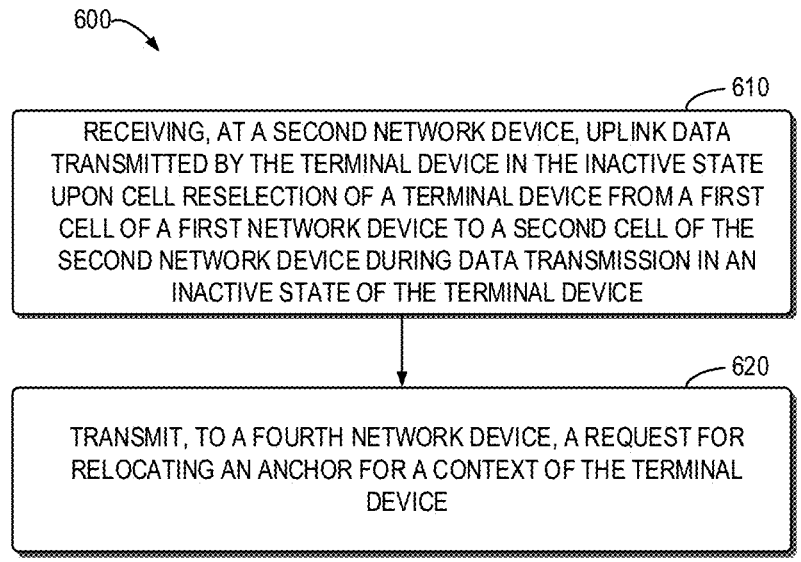
FIG. 6 illustrates an example method of communication implemented at a second network device as a new serving network device in accordance with some embodiments of the present disclosure.

FIG. 6 illustrates an example method 600 of communication implemented at a second network device (i.e., a new serving network device) in accordance with some embodiments of the present disclosure. For example, the method 600 may be performed at the second network device 120 as shown in FIG. 1. For the purpose of discussion, in the following, the method 600 will be described with reference to FIG. 1. It is to be understood that the method 600 may include additional blocks not shown and/or may omit some blocks as shown, and the scope of the present disclosure is not limited in this regard.

As shown in FIG. 6, at block 610, the second network device 120 receives, from the terminal device 150, a first request for resuming connection upon cell reselection of the terminal device 150 from a first cell of the first network device 110 to a second cell of the second network device 120 during data transmission in an inactive state of the terminal device 150.

In some embodiments, the data transmission in the inactive state can be performed in the second cell, and the second network device 120 may also receive, from the terminal device 150, uplink data in the data transmission that is not transmitted successfully. In some embodiments, the second network device 120 may also receive, from the terminal device 150, a PDCP status report for a DRB in an AM of the RLC layer.

At block 620, the second network device 120 transmits, to the fourth network device 140 maintaining the context of the terminal device 150, a second request for relocating an anchor for a context of the terminal device. In some embodiments, the second request may comprise user plane transport network layer (UP TNL) information for the data transmission. In these embodiments, the second network device 120 may receive a response to the request from the fourth network device 140, the response comprising the context and information about sequence number and hyper frame number of data packets associated with the data transmission. In some embodiments, the second network device 120 may also receive the data packets from the fourth network device based on the context and information.

In some alternative embodiments, the second network device 120 may receive a response to the request from the fourth network device 140, the response comprising the context. In some embodiments, the second network device 120 may also receive, from the fourth network device 140, a message comprising information about sequence number and hyper frame number of data packets associated with the data transmission, the message being dedicated for transmission of the information. In some embodiments, the second network device 120 may also receive the data packets from the fourth network device 140 based on the context and the information.

In some embodiments, the second request does not comprise the UP TNL information for the data transmission. In these embodiments, the second network device 120 may receive, from the fourth network device 140, a third request for obtaining the UP TNL information for the data transmission, and then transmit, to the fourth network device 140, the UP TNL information for the data transmission. In some embodiments, the third request may comprise at least one of PDU session ID or a list of IDs of one or more DRBs.

Figure 7:
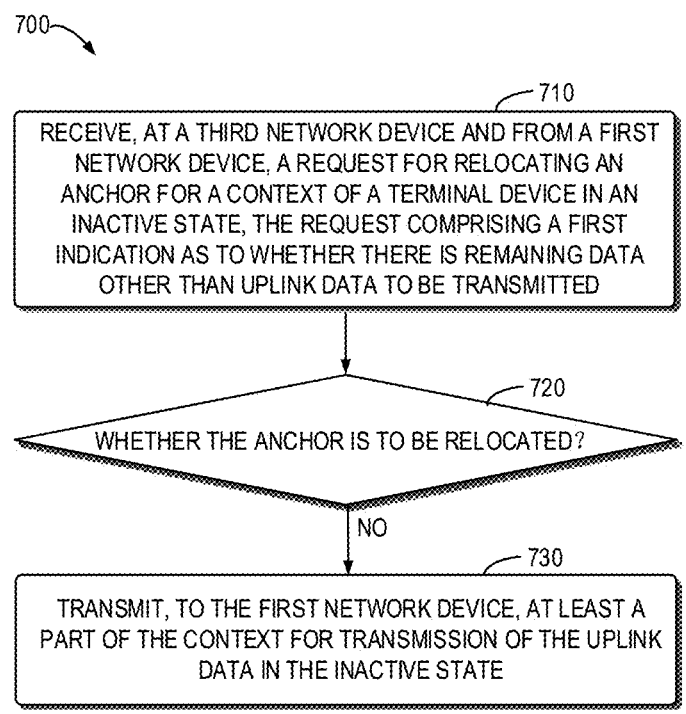
FIG. 7 illustrates an example method of communication implemented at a third network device as a last serving network device during SDT in accordance with some embodiments of the present disclosure.

FIG. 7 illustrates an example method 700 of communication implemented at a third network device (i.e., a last serving network device during SDT) in accordance with some embodiments of the present disclosure. For example, the method 700 may be performed at the third network device 130 as shown in FIG. 1. For the purpose of discussion, in the following, the method 700 will be described with reference to FIG. 1. It is to be understood that the method 700 may include additional blocks not shown and/or may omit some blocks as shown, and the scope of the present disclosure is not limited in this regard.

As shown in FIG. 7, at block 710, the third network device 130 receives a request for relocating an anchor for a context of the terminal device 150 in an inactive state, the request comprising a first indication as to whether there is remaining data other than uplink data to be transmitted, the third network device 130 maintaining the context of the terminal device 150. In some embodiments, the first indication may comprise at least one of the following: UP TNL information for downlink transmission; or a BSR from the terminal device.

At block 720, the third network device 130 determines whether the anchor is relocated based on the first indication. In some embodiments, if determining that the anchor is not to be relocated, at block 730, the third network device 130 transmits, to the first network device 110, at least a part of the context for transmission of the uplink data in the inactive state.

In some embodiments, the third network device 130 may transmit, to the first network device 110, a message comprising a connection release message to be transmitted to the terminal device, UP TNL information for uplink transmission and a part of the context comprising at least RLC configuration of the terminal device 150. In some alternative embodiments, the third network device 130 may transmit, to the first network device 110, a response to the request to the first network device 110, the response comprising the context and a second indication that the anchor is not relocated.

Figure 8:
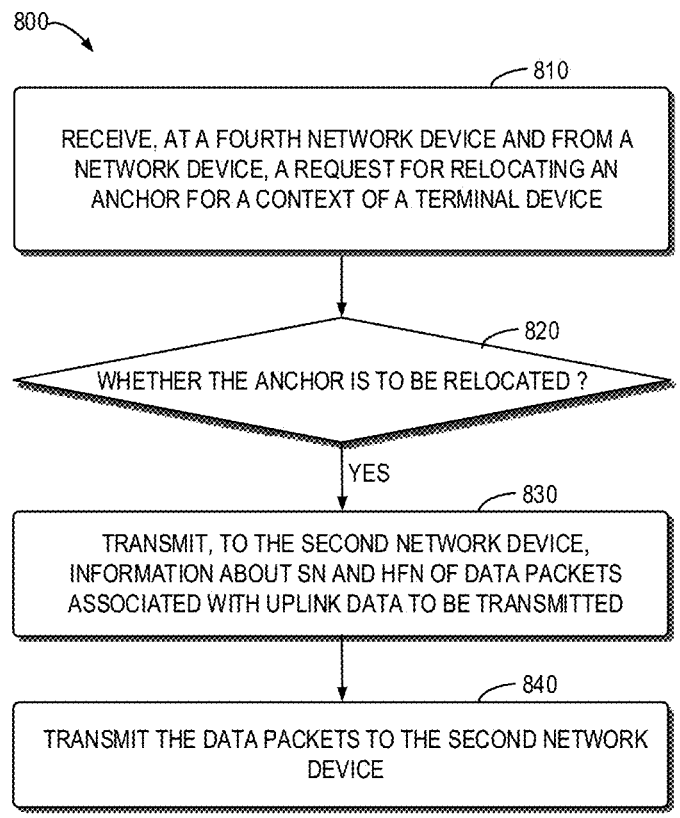
FIG. 8 illustrates an example method of communication implemented at a fourth network device as a last serving network device upon cell reselection in accordance with some embodiments of the present disclosure.

FIG. 8 illustrates an example method 800 of communication implemented at a fourth network device (i.e., a last serving network device upon cell reselection) in accordance with some embodiments of the present disclosure. For example, the method 800 may be performed at the fourth network device 140 as shown in FIG. 1. For the purpose of discussion, in the following, the method 800 will be described with reference to FIG. 1. It is to be understood that the method 800 may include additional blocks not shown and/or may omit some blocks as shown, and the scope of the present disclosure is not limited in this regard.

As shown in FIG. 8, at block 810, the fourth network device 140 receives from the second network device 120, a request for relocating an anchor for a context of the terminal device 150. The fourth network device 140 maintains the context of the terminal device 150. In some embodiments, the request may comprise UP TNL information for uplink and downlink transmission (i.e., UP TNL information for data forwarding).

In some embodiments, the request does not comprise UP TNL information for uplink and downlink transmission (i.e., UP TNL information for data forwarding). In these embodiments, the fourth network device 140 may transmit, to the second network device 120, a third request for obtaining the UP TNL information for data forwarding, and receive the UP TNL information from the second network device 120.

At block 820, the fourth network device 140 determines whether the anchor is to be relocated. If determining that the anchor is to be relocated, at block 830, the fourth network device 140 transmits, to the second network device 120, information about sequence number and hyper frame number of data packets associated with uplink data to be transmitted. In some embodiments, the fourth network device 140 may transmit the information in a response to the request to the second network device 120, the response comprising the context. In some embodiments, the fourth network device 140 may transmit the information in a message dedicated for transmission of the information.

At block 840, the fourth network device 140 transmits the data packets to the second network device 120.

The implementations of the methods described in FIGS. 4-8 substantially correspond to the processes described in connection with FIGS. 2 and 3, and thus other details are not repeated here. With the methods 400-800 according to embodiments of the present disclosure, an enhanced mechanism for SDT is achieved, and lossless transmission for SDT is attained.

Example of Device

Figure 9:
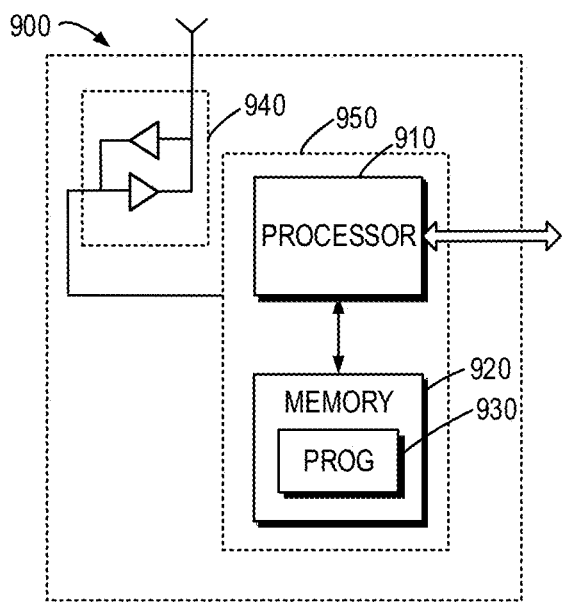
FIG. 9 is a simplified block diagram of a device that is suitable for implementing embodiments of the present disclosure.

FIG. 9 is a simplified block diagram of a device 900 that is suitable for implementing embodiments of the present disclosure. The device 900 can be considered as a further example implementation of the first, second, third, fourth network devices 110, 120, 130, 140 or the terminal device 150 as shown in FIG. 1. Accordingly, the device 900 can be implemented at or as at least a part of the first, second, third, fourth network devices 110, 120, 130, 140 or the terminal device 150.

As shown, the device 900 includes a processor 910, a memory 920 coupled to the processor 910, a suitable transmitter (TX) and receiver (RX) 940 coupled to the processor 910, and a communication interface coupled to the TX/RX 940. The memory 910 stores at least a part of a program 930. The TX/RX 940 is for bidirectional communications. The TX/RX 940 has at least one antenna to facilitate communication, though in practice an Access Node mentioned in this application may have several ones. The communication interface may represent any interface that is necessary for communication with other network elements, such as X2/Xn interface for bidirectional communications between eNBs/gNBs, S1/NG interface for communication between a Mobility Management Entity (MME)/Access and Mobility Management Function (AMF)/SGW/UPF and the eNB/gNB, Un interface for communication between the eNB/gNB and a relay node (RN), or Uu interface for communication between the eNB/gNB and a terminal device.

The program 930 is assumed to include program instructions that, when executed by the associated processor 910, enable the device 900 to operate in accordance with the embodiments of the present disclosure, as discussed herein with reference to FIGS. 1 to 8. The embodiments herein may be implemented by computer software executable by the processor 910 of the device 900, or by hardware, or by a combination of software and hardware. The processor 910 may be configured to implement various embodiments of the present disclosure. Furthermore, a combination of the processor 910 and memory 920 may form processing means 950 adapted to implement various embodiments of the present disclosure.

The memory 920 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 920 is shown in the device 900, there may be several physically distinct memory modules in the device 900. The processor 910 may be of any type suitable to the local technical network, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2 to 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of communication performed by a first network device, the method comprising:
   receiving, from a terminal device, uplink Small Data Transmission (SDT) data in an inactive state;
   transmitting, to a second network device, a first message to request the second network device to transfer a context of the terminal device to the first network device, the first message comprising a first indication indicating whether subsequent SDT transmission is expected; and
   receiving, from the second network device, a second message for transmitting only a part of the context of the terminal device, wherein the second message includes Radio Link Control (RLC) configuration of the terminal device.

2. The method of the first network device according to claim 1, wherein the uplink SDT data is Random Access (RA)-based and an RRC Resume Request message.

3. The method of the first network device according to claim 1, wherein the first message is a RETRIEVE UE CONTEXT REQUEST message.

4. The method of the first network device according to claim 1, wherein the context of the terminal device is decided by the second network device not to be fully relocated.

5. A method of communication performed by a terminal device, the method comprising:
   communicating with a second network device; and
   transmitting, in an inactive state, uplink Small Data Transmission (SDT) data to a first network device,
   wherein a first message, to request the second network device to transfer a context of the terminal device to the first network device, is transmitted from the first network device to the second network device, the first message comprising a first indication indicating whether subsequent SDT transmission is expected, and
   wherein a second message is transmitted by the second network device for transmitting only a part of the context of the terminal device, wherein the second message includes Radio Link Control (RLC) configuration of the terminal device.

6. The method of the terminal device according to claim 5, wherein the uplink SDT data is Random Access (RA)-based and an RRC Resume Request message.

7. The method of the terminal device according to claim 5, wherein the first message is a RETRIEVE UE CONTEXT REQUEST message.

8. The method of the terminal device according to claim 5, wherein the context of the terminal device is decided by the second network device not to be fully relocated.

9. A first network device, comprising:
   at least one memory having program instructions stored therein;
   at least one processor configured to execute the program instructions, that when executed perform operations comprising:
      receiving, from a terminal device, uplink Small Data Transmission (SDT) data in an inactive state;
      transmitting, to a second network device, a first message to request the second network device to transfer a context of the terminal device to the first network device, the first message comprising a first indication indicating whether subsequent SDT transmission is expected; and
      receiving, from the second network device, a second message for transmitting only a part of the context of the terminal device, wherein the second message includes Radio Link Control (RLC) configuration of the terminal device.

10. The first network device according to claim 9, wherein the uplink SDT data is Random Access (RA)-based and an RRC Resume Request message.

11. The first network device according to claim 9, wherein the first message is a RETRIEVE UE CONTEXT REQUEST message.

12. The first network device according to claim 9, wherein the context of the terminal device is decided by the second network device not to be fully relocated.

* * * * *